(12) United States Patent
Cartailler et al.

(10) Patent No.: US 10,543,749 B2
(45) Date of Patent: Jan. 28, 2020

(54) SYSTEM AND METHOD FOR DISSIPATING ELECTRIC ENERGY REGENERATED BY ACTUATORS

(71) Applicant: SAFRAN ELECTRICAL & POWER, Blagnac (FR)

(72) Inventors: Laurent Cartailler, Massy (FR); Benoit Michaud, Vernou la Celle sur Seine (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 15/568,344

(22) PCT Filed: Apr. 21, 2016

(86) PCT No.: PCT/FR2016/050936
§ 371 (c)(1),
(2) Date: Oct. 20, 2017

(87) PCT Pub. No.: WO2016/193559
PCT Pub. Date: Dec. 8, 2016

(65) Prior Publication Data
US 2018/0141440 A1 May 24, 2018

(30) Foreign Application Priority Data
Apr. 23, 2015 (FR) ..................................... 15 53650

(51) Int. Cl.
*B60L 7/02* (2006.01)
*H02P 3/12* (2006.01)
*H02P 3/22* (2006.01)

(52) U.S. Cl.
CPC .................. *B60L 7/02* (2013.01); *H02P 3/12* (2013.01); *H02P 3/22* (2013.01)

(58) Field of Classification Search
CPC ...... B60L 7/02; B60L 1/20; H02P 3/12; H02P 8/16; H02H 11/00
See application file for complete search history.

(56) References Cited

U.S. PATENT DOCUMENTS 4,730,246 A * 3/1988 Schwesig .......... H02M 7/53875
363/132
5,323,095 A * 6/1994 Kumar ..................... B60L 7/04
318/152

(Continued)

FOREIGN PATENT DOCUMENTS

EP  1 674 326 A2  6/2006
EP  1 944 779 A2  7/2008

(Continued)

OTHER PUBLICATIONS

International Search Report as issued in International Patent Application No. PCT/FR2016/050936, dated Jul. 29, 2016.

*Primary Examiner* — Bickey Dhakal
*Assistant Examiner* — Said Bouziane
(74) *Attorney, Agent, or Firm* — Pillsbury Winthrop Shaw Pittman LLP

(57) ABSTRACT

A system for dissipating regenerated electric energy produced by an electric actuator of an aircraft, the dissipating system including: a resistor; two switching arms, each switching arm being connected in series with the resistor, the two switching arms being connected together in parallel, each switching arm including two switches connected to one another in series, each switch including two terminals and a control grid, each switch being capable of being controlled by controlling the potential applied to the control grid thereof; and a measurement system capable of measuring the voltage at the terminals of each switch.

9 Claims, 5 Drawing Sheets

(56) References Cited

U.S. PATENT DOCUMENTS

| | | | |
|---|---|---|---|
| 2006/0132073 A1* | 6/2006 | Pispa | B60L 7/06 318/380 |
| 2008/0165457 A1* | 7/2008 | Premerlani | H01H 59/0009 361/31 |
| 2013/0215658 A1 | 8/2013 | Jakob et al. | |
| 2014/0015456 A1* | 1/2014 | Nishio | B60L 7/14 318/376 |

FOREIGN PATENT DOCUMENTS

| | | |
|---|---|---|
| FR | 2 967 847 A1 | 5/2012 |
| JP | S60-197179 A | 10/1985 |

* cited by examiner

SYSTEM AND METHOD FOR DISSIPATING ELECTRIC ENERGY REGENERATED BY ACTUATORS

CROSS-REFERENCE TO RELATED APPLICATIONS

This is the U.S. National Stage of PCT/FR2016/050936, filed Apr. 21, 2016, which in turn claims priority to French Patent Application No. 1553650, filed Apr. 23, 2015, the entire contents of all applications are incorporated herein by reference in their entireties.

TECHNICAL FIELD

The present invention relates to a system and a method intended to dissipate electric energy regenerated by the electric actuators of an aircraft.

PRIOR ART

As described in the preamble of patent application FR2967847, the electric actuators of an aircraft can operate according to two modes:
- A motor mode, in which an electrical power supply of the aircraft supplies them with energy. This electrical power supply must generally be a direct supply. To achieve this, aircraft generally comprise an alternating electrical power supply and a rectifier which makes it possible to convert the alternating voltage current supplied by the electrical power supply of the airplane into direct voltage current; Said rectifier may also be situated in the actuator itself;
- A generator mode, in which the electric actuators produce electricity. This energy is generally called "regenerated electric energy". Regenerated electric energy is for example produced during in-flight manoeuvres of the airplane during which the actuators of flight controls can send back energy.

However, in current aircraft electrical networks, this regenerated electric energy cannot be sent back to the electrical power supply of the aircraft. Consequently, in the prior art, as represented schematically in FIG. 1, each actuator 1 is connected to the electrical power supply 2 of the airplane through an electric converter 3 comprising:
- a rectifier 4 making it possible to convert the alternating voltage current supplied by the electrical power supply of the airplane into direct voltage current;
- a system for dissipating 5 regenerated energy;
- a capacitance 6.

A system for dissipating 5 regenerated energy of the prior art is represented more specifically in FIG. 2. It comprises:
- a resistor 8 making it possible to dissipate by Joule effect the regenerated electric energy produced by the electric actuator 1;
- a controllable switch 7 connected in series with the resistor 8;
- a free wheel diode 9 which makes it possible to avoid voltage surges at the terminals of the resistor 8 when the switch 7 is opened.

Such an energy dissipating system is controlled thanks to its switch 7. This can be controlled by a pulse width modulation signal of which the cyclic ratio is regulated so as to control the quantity of energy dissipated in the resistor. Indeed, when the quantity of regenerated electric energy produced by the electric actuator increases, the cyclic ratio of the control signal applied to the switch is increased. On the contrary, when the quantity of regenerated electric energy produced by the electric actuator decreases, the cyclic ratio of the control signal applied to the switch is decreased. Other control methods, such as control of the voltage by thresholds (hysteresis comparator) may be used.

Such an energy dissipating system is efficient. However, the fact of having as many energy dissipating systems as electric actuators increases the weight and the cost of the system installed on board the aircraft.

It would thus be advantageous to connect all the electric actuators to a same dissipating system. However, if the dissipating system breaks down, the regenerated electric energy produced by one of the electric actuators would no longer be dissipated, such that it could damage or even destroy the other actuators and/or the electrical power supply of the airplane, damage linked to the increase in direct voltage at the terminals of the decoupling capacitances.

Yet, it has been observed that energy dissipating systems of the prior art do not have the availability for dissipating the regenerated electric energy of several electric actuators.

DESCRIPTION OF THE INVENTION

The invention aims to overcome the drawbacks of the prior art by proposing a system for dissipating the energy regenerated by at least one actuator of an aircraft which is more available than those of the prior art.

To achieve this, according to a first aspect of the invention, a system is proposed for dissipating regenerated electric energy produced by an electric actuator (1) of an aircraft, the dissipating system comprising:
- a resistor;
- two switching arms, each switching arm being connected in series with the resistor, the two switching arms being connected together in parallel, each switching arm comprising two switches connected to one another in series, each switch comprising two terminals and a control grid, each switch being capable of being controlled by controlling the potential applied to the control grid thereof;
- measurement means capable of measuring the voltage at the terminals of each switch.

The energy dissipating system is particularly advantageous because it has been observed that in energy dissipating systems of the prior art, the component that broke down the most often was the switch. The energy dissipating system according to the invention makes it possible to overcome the drawbacks of the prior art by measuring the voltage at the terminals of each switch, which makes it possible to know at any instant whether each switch is functional or not. Indeed, when a switch functions correctly and when it is closed, the voltage at the terminals thereof must be below a threshold voltage. In the same way, when a switch functions correctly and when it is open, the voltage at the terminals thereof must be above the threshold voltage. By measuring the voltage at the terminals of each switch and by comparing it with a threshold voltage, it is thus possible to know at any instant whether said switch is functional or not. If it is detected that a switch no longer functions, it is then possible to open the other switch belonging to the same arm as the faulty switch and to function uniquely with the other arm. The energy dissipating system according to the invention thus has greater availability than those of the prior art.

The energy dissipating system according to the first aspect of the invention may also have one or more of the following characteristics taken independently or according to all technically possible combinations thereof.

Advantageously, the dissipating system further comprises a balancing circuit mounted in parallel with each switch, each balancing circuit comprising a resistor, designated "balancing resistor", and a capacitance, designated "balancing capacitance". The balancing circuits mounted in parallel with each switch make it possible to control the potential at the level of the mid-point situated between the two switches of a same arm, notably when the switches are open. Indeed, in the absence of these balancing circuits, during the switching of each switch from a closed position to an open position, the potential between the two switches of a same arm would not be controlled such that the voltage measured at the terminals of each switch would not be reliable. The balancing circuits make it possible to spread out the voltage between the two switches of a same arm so that the voltage measured at the terminals of each switch is more reliable. Moreover, these balancing circuits make it possible to do without the free wheel diode which is mounted in parallel with the dissipation resistor of dissipating systems of the prior art since they make it possible, like said diode, to avoid voltage surges at the terminals of the switches when the switches are opened.

The value of the balancing resistor and the balancing capacitance are preferably selected so that:
  the time constant RC of the balancing circuit is sufficient to compensate dispersions of switching times of the switches and thereby guarantee reliable detection of the open or closed state of the switch;
  the time constant RC of the balancing circuit is compatible with the switching times of the switches, which may be parameterized by means of the gate resistors of the driver;
  the balancing capacitance is sufficiently high to recover all or part of the energy stored in the inductance formed by the dissipation resistor and the wiring thereof;
  the balancing capacitance is sufficiently low so as not to store too much energy which will be dissipated at the moment of closing the switch;
  the value of the balancing resistor is sufficiently low so as not to create a voltage surge on blocking the switch linked to current circulating in the dissipation resistor;
  the power of the balancing resistor is compatible with the energy stored in the balancing capacitance.

Advantageously, the dissipating system further comprises a compensation circuit mounted in parallel with each switch, each compensation circuit comprising a resistor, designated "compensation resistor". This compensation resistor makes it possible to compensate leakage currents of the switch when it is open, which also makes it possible to balance out the spread of voltage between the two switches of a same arm when they are open.

The value of the compensation resistor is preferably strictly below the impedance of the switch to the terminals of which it is connected when the switch is open.

More specifically, the value of the compensation resistor is preferably substantially equal to the value divided by ten of the impedance of the switch to the terminals of which it is connected when the switch is open.

According to different embodiments, each switch may be:
  an Insulated Gate Bipolar Transistor, also called IGBT;
  a Metal Oxide Semiconductor Field Effect Transistor, also called MOSFET;
  an Integrated Gate-Commutated Thyristor, also called IGCT;
  a Gate Turn-Off Thyristor, also called GTO;
  a bipolar transistor;
  a SiC JFET transistor, normally off.

A second aspect of the invention relates to an electric converter for supplying at least one electric actuator of an aircraft from an alternating electrical power supply, the converter comprising:
  a rectifier;
  a dissipating system according to the first aspect of the invention, the dissipating system being mounted in parallel with the rectifier;
  a capacitance mounted in parallel with the dissipating system.

This converter is advantageous because it makes it possible to supply several electric actuators simultaneously.

A third aspect of the invention relates to a method for dissipating regenerated energy in a system according to the first aspect of the invention, wherein the two switches of a same arm are controlled so as to be open simultaneously and closed simultaneously, the switches further being controlled so as to close alternately the two arms. Indeed, the fact of alternately operating the two arms make it possible to test permanently all the switches. Moreover, this makes it possible to load all the switches in a balanced manner.

Advantageously, each switch is controlled by a pulse width modulation signal, designated "normal signal", the normal signals controlling the two arms being dephased with respect to each other so that one arm is closed whereas the other arm is open. It is thereby possible to regulate the quantity of regenerated energy dissipated in the dissipation resistor by spreading out the control on the two arms.

Advantageously, each time that a switch is closed, the method comprises the following steps:
  measuring the voltage at the terminals of said switch;
  comparing the measured voltage with a threshold voltage.

These steps make it possible to test that a switch is functional each time that it passes into closed position.

In this case, if the voltage measured at the terminals of a switch, designated "faulty switch", is above the threshold voltage, the method preferably comprises the following steps:
  maintaining the switch belonging to the same arm as the faulty switch in an open position;
  controlling the switches belonging to the other arm by a pulse width modulation signal, designated "signal in case of failure", having a frequency two times greater than the frequency of the normal signal.

Thus, if it is detected that a switch is faulty, the arm to which it belongs is condemned and only the other arm is used.

Advantageously, each time that a switch is open, the method comprises the following steps:
  measuring the voltage at the terminals of said switch;
  comparing the measured voltage with a threshold voltage.

These steps make it possible to test that a switch is functional each time it passes into open position.

In this case, if the voltage measured at the terminals of a switch, designated "faulty switch", is below the threshold voltage, the method preferably comprises the following steps:
  maintaining the switch belonging to the same arm as the faulty switch in an open position;
  controlling the switches belonging to the other arm by a pulse width modulation signal, designated "signal in case of failure", having a frequency two times greater than the frequency of the normal signal.

This is particularly advantageous when a switch is in short circuit since it is then possible to open the arm to which it belongs by means of the other switch of the same arm and to continue to function normally thanks to the other arm.

BRIEF DESCRIPTION OF THE FIGURES

Other characteristics and advantages of the invention will become clear from reading the detailed description that follows, with reference to the appended figures, which illustrate.

For greater clarity, identical or similar elements are marked by identical reference signs in all of the figures.

DETAILED DESCRIPTION OF AT LEAST ONE EMBODIMENT

Figure 1:
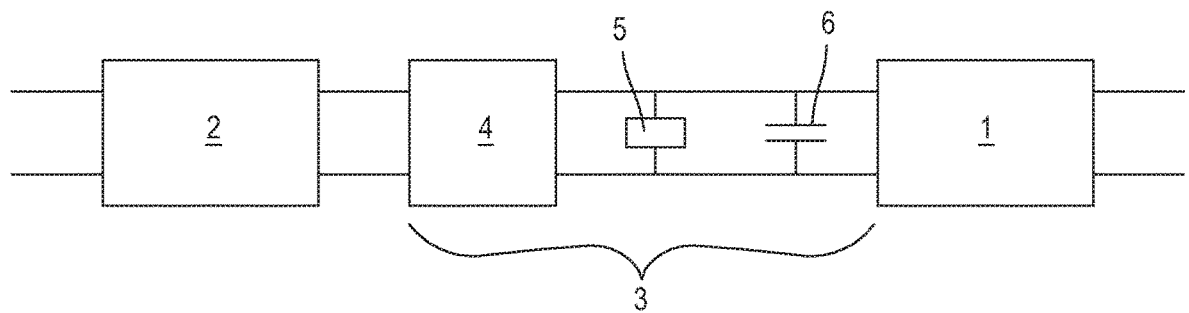
FIG. 1, a schematic representation of an electric actuator of the prior art connected to an electrical power supply of an aircraft.
Figure 2:
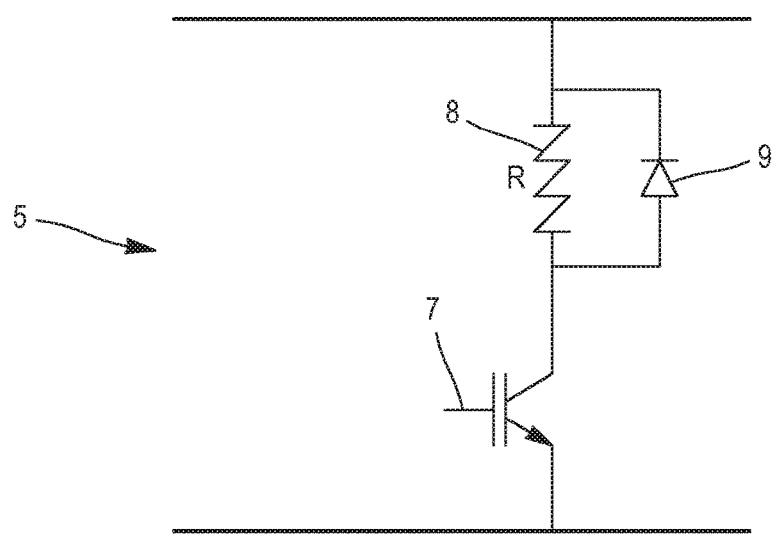
FIG. 2, a schematic representation of a system for dissipating energy of the prior art.
Figure 3:
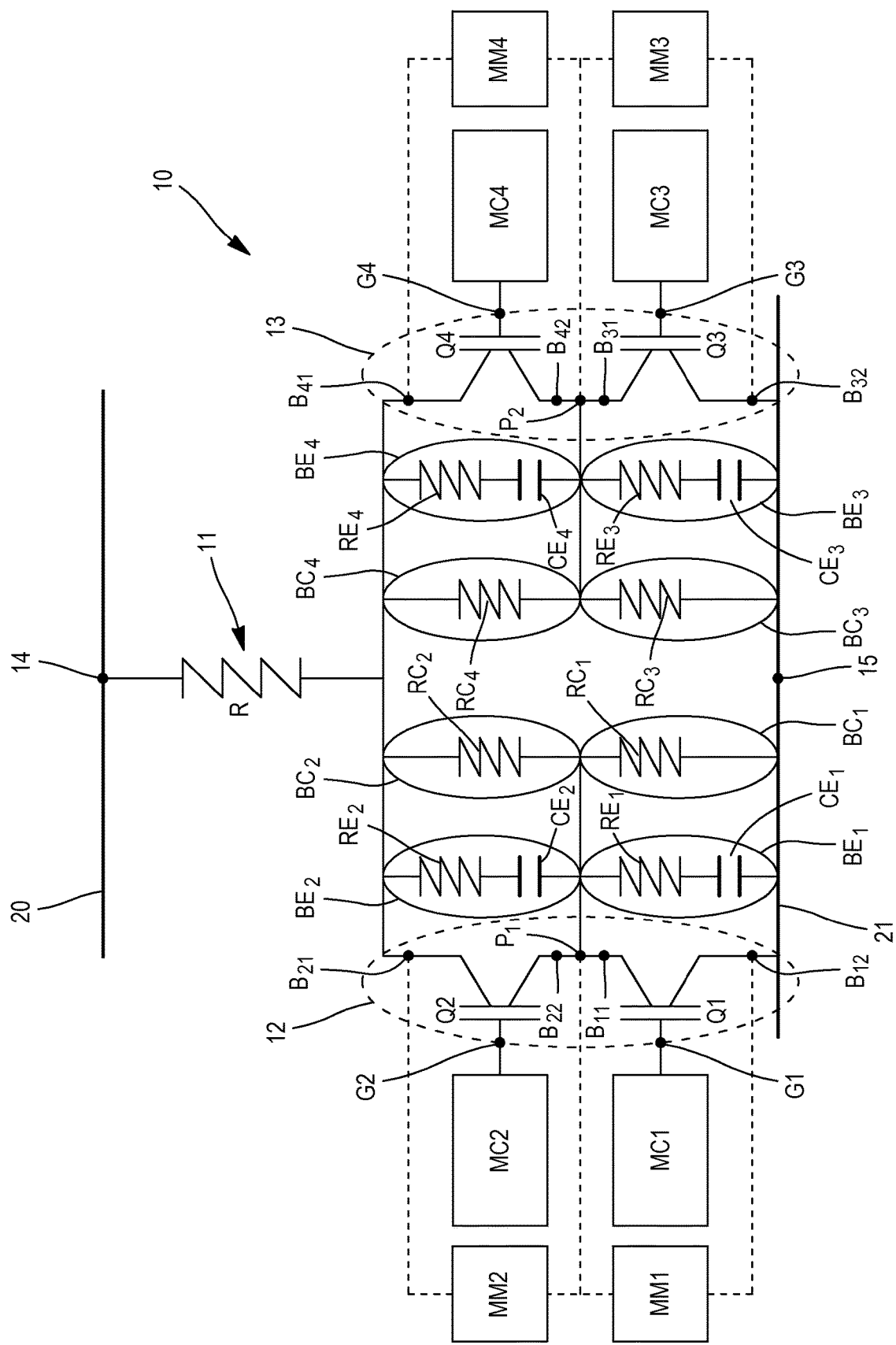
FIG. 3, a schematic representation of a system for dissipating energy according to one embodiment of the invention.

FIG. 3 represents an energy dissipating system 10 according to one embodiment of the invention.

This energy dissipating system comprises a resistor R, designated "dissipation resistor". The dissipation resistor R is capable of dissipating energy by Joule effect. The energy dissipating system also comprises two arms, designated "switching arms" 12 and 13. Each switching arm 12, 13 is connected in series with the dissipation resistor R. The two switching arms 12, 13 are connected in parallel with each other.

Each switching arm 12, 13 comprises two switches Q1, Q2 and Q3, Q4 connected to one another in series. Each switch comprises two terminals $B_{11}$, $B_{12}$, $B_{21}$, $B_{22}$, $B_{31}$, $B_{32}$, $B_{41}$, $B_{42}$. Each switch comprises a control grid G1, G2, G3, G4. Between two switches Q1, Q2 and Q3, Q4 of a same arm is located a point designated "mid-point" P1, P2.

Each switch is controllable. Indeed, each switch Q1, Q2, Q3, Q4 may be closed or open. To this end, the potential applied to the control grid of each switch may be selected as a function of the state in which it is wished to place the switch.

Each switch Q1, Q2, Q3, Q4 may for example be:
a Metal Oxide Semiconductor Field Effect Transistor, also called MOSFET;
an Integrated Gate-Commutated Thyristor, also called IGCT;
a Gate Turn-Off Thyristor, also called GTO;
a bipolar transistor
a SiC JFET transistor, normally off.

According to a preferential embodiment, each switch Q1, Q2, Q3, Q4 is an Insulated Gate Bipolar Transistor, also called IGBT.

The energy dissipating system also comprises means for controlling MC1, MC2, MC3, MC4 each switch. These control means MC1, MC2, MC3, MC4 make it possible to apply a voltage control signal controlled on the control grid G1, G2, G3, G4 of each switch so as to control the opening and the closing of said switch.

The energy dissipating system also comprises measurement means MM1, MM2, MM3, MM4 configured to measure the voltage at the terminals $B_{11}$, $B_{12}$, $B_{21}$, $B_{22}$, $B_{31}$, $B_{32}$, $B_{41}$, $B_{42}$ of each switch Q1, Q2, Q3, Q4. Indeed, the fact of measuring the voltage at the terminals of each switch makes it possible to know whether said switch is functional or not. Indeed, when a switch is functional and when it is open, the voltage at the terminals thereof must be above a threshold voltage. Conversely, when a switch is functional and when it is closed, the voltage at the terminals thereof must be below a threshold voltage. Consequently, by measuring the voltage at the terminals of each switch, it is possible to know whether said switches are functional or not.

The energy dissipating system also comprises circuits designated "balancing circuit" BE1, BE2, BE3, BE4. Each balancing circuit BE1, BE2, BE3, BE4 is connected in parallel with one of the switches Q1, Q2, Q3, Q4. Each balancing circuit BE1, BE2, BE3, BE4 comprises a resistor, designated "balancing resistor" RE1, RE2, RE3, RE4 and a capacitance, designated "balancing capacitance" CE1, CE2, CE3, CE4. These balancing circuits make it possible to spread out the voltage between the two switches of a same branch when these switches pass from a closed state to an open state. These balancing circuits thus make it possible to manage the potential of the mid-point P1, P2 of each branch. These balancing circuits also make it possible to avoid voltage surges at the terminals of the switches when the switches are opened without having to use a free wheel diode.

The value of each balancing resistor RE1, RE2, RE3, RE4 and the value of each balancing capacitance CE1, CE2, CE3, CE4 are preferably selected as follows:
the time constant RC of the balancing circuit is sufficient to compensate dispersions of switching times of the switches and thereby to guarantee reliable detection of the state (open/closed) of the switch;
the time constant RC of the balancing circuit is compatible with the switching times of the switches, which may be parameterized using the gate resistors of the driver;
the balancing capacitance is sufficiently high to recover all or part of the energy stored in the inductance formed by the dissipation resistor and the wiring thereof;
the balancing capacitance is sufficiently low so as not to store too much energy which will be dissipated at the moment of closing the switch;
the value of the balancing resistor is sufficiently low so as not to create a voltage surge on blocking the switch linked to current circulating in the dissipation resistor;
the power of the balancing resistor is compatible with the energy stored in the balancing capacitance.

The energy dissipating system also comprises circuits, designated "compensation circuits" BC1, BC2, BC3, BC4. Each compensation circuit BC1, BC2, BC3, BC4 is connected in parallel to one of the switches Q1, Q2, Q3, Q4. Each compensation circuit BC1, BC2, BC3, BC4 comprises a resistor, designated "compensation resistor", RC1, RC2, RC3, RC4. The compensation resistors make it possible to balance the energy dissipating system vis-à-vis leakage currents of the switches when they are open.

The value of each compensation resistor RC1, RC2, RC3, RC4 is strictly below the value of the impedance of the switch Q1, Q2, Q3, Q4 to which it is connected. The value of each compensation resistor RC1, RC2, RC3, RC4 is preferably equal to the value divided by 10 of the impedance of the switch Q1, Q2, Q3, Q4 to which it is connected.

The balancing circuits BE1, BE2, BE3, BE4 and the compensation circuits BC1, BC2, BC3, BC4 thus make it possible to control the potential at the mid-point P1, P2 of each arm, so that the voltage measurement carried out at the terminals of each switch is reliable and actually representative of the state of each switch.

Figure 4:
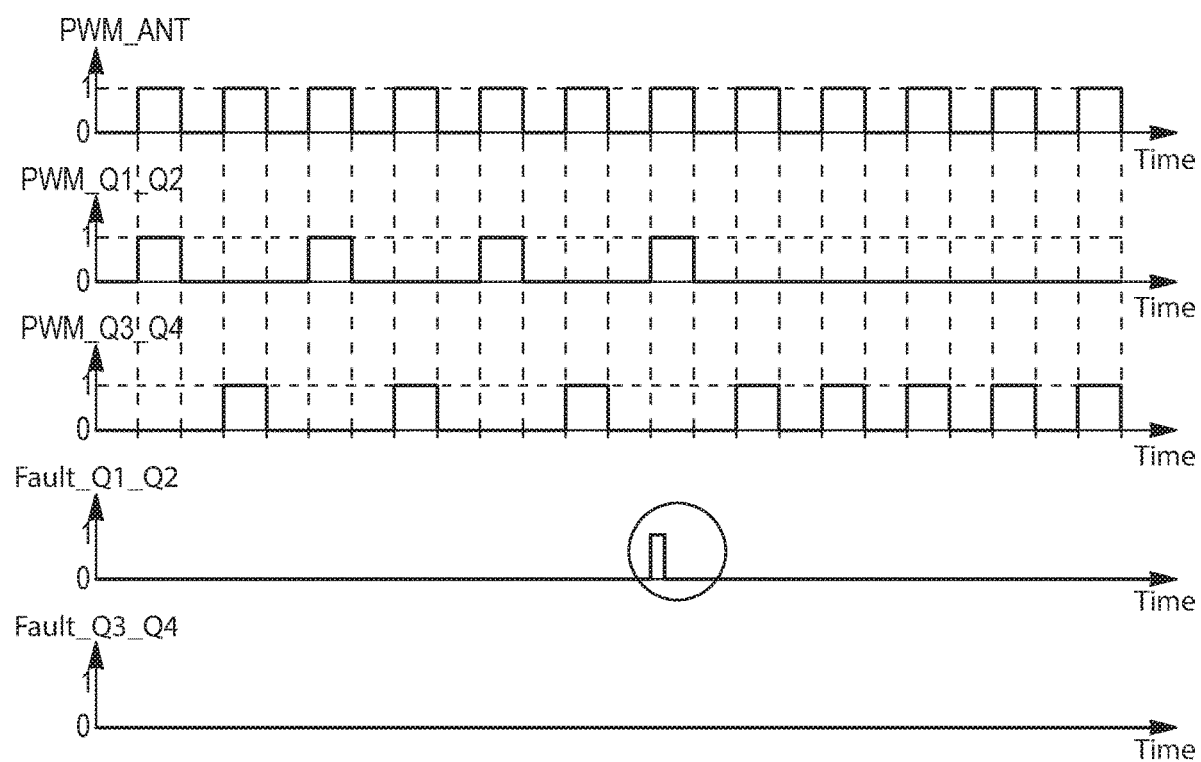
FIG. 4, a schematic representation of signals for controlling the system of FIG. 3.

An example of method for controlling the energy dissipating system of FIG. 3 will now be detailed with reference to FIG. 4.

The control signal may be generated by a PWM as represented hereafter, but it may also be generated by other control systems such as control by hysteresis which consists in closing the switch as soon as the voltage at the terminals of the capacitor is above a threshold and opening the switch as soon as it is below a second threshold lower than the first.

Finally, the signal may also be generated by a logic OR between the two controls, which makes it possible to ensure even greater service availability.

The curve PWM_ANT represents the control signal that would be used if the energy dissipating system comprised a single switch. This control signal PWM_ANT is a pulse width modulation signal, also called PWM. It preferably has a constant frequency. The quantity of energy dissipated in the resistor is controlled by controlling the cyclic ratio of this signal PWM_ANT.

The curve PWM_Q1-Q2 represents the control signal applied to each of the switches Q1 and Q2 which belong to the first arm 12. The curve PWM_Q3-Q4 represents the control signal applied to each of the switches Q3 and Q4 which belong to the second arm 13. The control signal applied to each switch is a pulse width modulation signal, also called PWM. As long as the two switches Q1, Q2 or Q3, Q4 belonging to a same arm are functional, preferably the same control signal is applied to the two switches which belong to a same arm so that the switches of a same arm are open at the same time and closed at the same time. On the other hand, the control signal PWM_Q1-Q2 applied to the switches Q1, Q2 of the first arm 12 is active alternately with respect to the control signal PWM_Q3-Q4 applied to the switches Q3, Q4 of the second arm 13. Moreover, as may be seen in FIG. 4, the control signal PWM_Q1-Q2 and PWM_Q3-Q4 applied to each arm has a cyclic ratio two times lower than the control signal PWM_ANT that would be used if the energy dissipating system only comprised a single arm. Indeed, the two arms are used alternately as long as all the switches are functional. This alternating use of the two arms makes it possible to check permanently that all the switches are functional.

To this end, the method also comprises a step of measuring the voltage at the terminals of each switch each time that said switch is closed. The method next comprises a step of comparing the measured voltage with a threshold voltage. As long as the measured voltage remains below the threshold voltage, the switch at the terminals of which the voltage has been measured is considered as functional. On the other hand, if it is detected that the voltage measured at the terminals of a switch is above the threshold voltage, said switch is considered as faulty.

As an example, it may for example be assumed that Q1 is considered as faulty.

The method then comprises a step of opening the other switch belonging to the same arm as the switch considered as faulty, in this example Q2, so as to neutralise the arm that comprises a faulty switch.

In the remainder of the control method, only the other arm, in our example, the second arm 13, is used. Consequently, the control signal PWM_Q3-Q4 applied to the second arm has a cyclic ratio equal to two times the cyclic ratio that was applied to each of the arms before the failure of the switch due to the doubling of the activation frequency of the arm.

Figure 5:
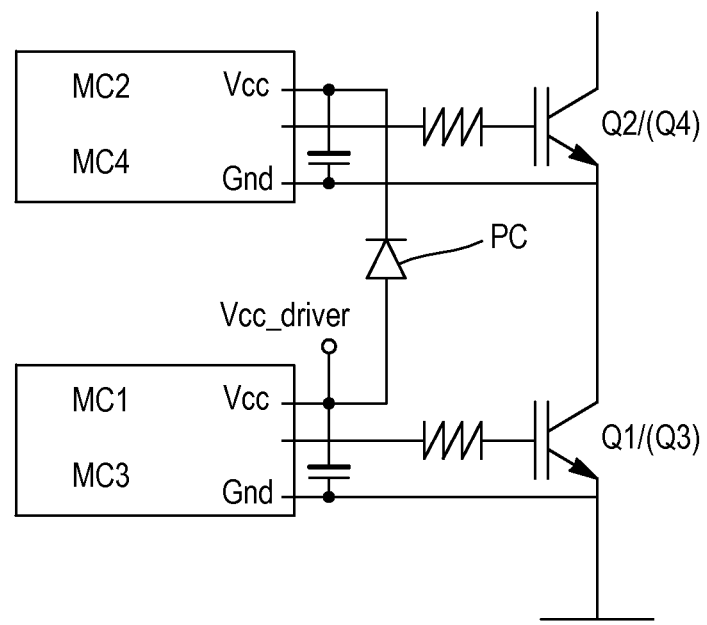
FIG. 5, a schematic representation of means for controlling the energy dissipating system of FIG. 3.

FIG. 5 represents an example of one of the control means which can be used to control the switches. As represented in this figure, a single supply Vcc_driver may be used to emit the control signals PWM_Q1-Q2 and PWM_Q3-Q4 making it possible to control the four switches. To this end, the controls of the switches Q2 and Q4 of the two arms may be supplied by charging pumps with the supply of the drivers of the switches Q1 and Q3 of the two arms referenced Bus HVDC.

Figure 6:
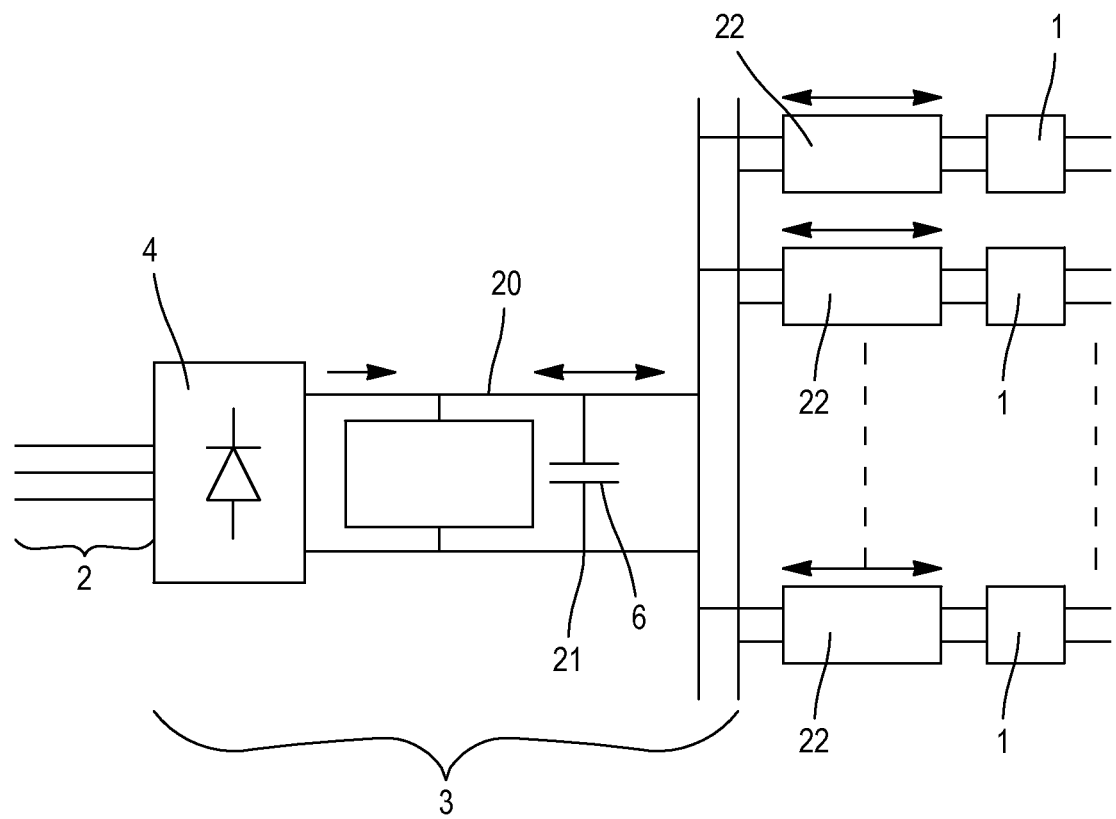
FIG. 6, a schematic representation of an electric converter according to one embodiment of the invention.

FIG. 6 represents an electric converter according to one embodiment of the invention. This electric converter makes it possible to connect an electrical power supply 2 of an aircraft to at least two electric actuators 1. To achieve this, the electric converter comprises a rectifier 4 making it possible to convert the alternating voltage current produced by the electrical power supply 2 of the airplane into direct voltage current. The converter thus comprises a first and a second bus 20, 21 at the output of the rectifier 4, the two buses 20, 21 making it possible to make current at the output of the rectifier transit to the electric actuators 1.

The electric converter also comprises an energy dissipating system 10 such as that described with reference to FIG. 3. This energy dissipating system comprises a first terminal 14 connected to the first bus 20 and a second terminal 15 connected to the second bus 21. The electric converter also comprises a capacitance 6 connected in parallel with the energy dissipating system and the rectifier. The electric converter is next connected to the electric actuators 1 via protection devices 22 making it possible to protect said electric actuators.

Naturally, the invention is not limited to the embodiments described with reference to the figures and alternatives could be envisaged without going beyond the scope of the invention.

Figure 7:
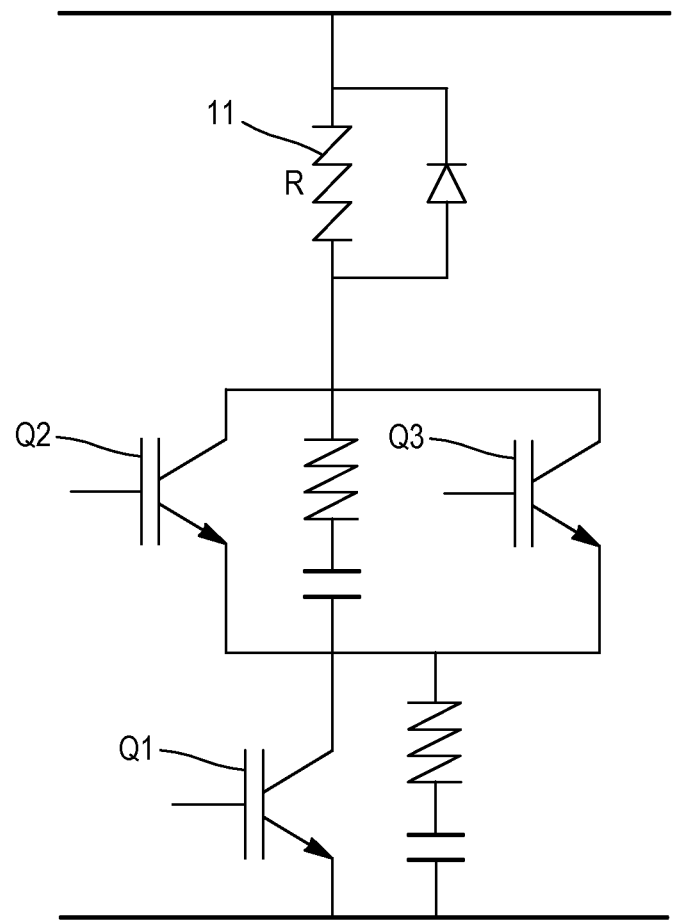
FIG. 7, a schematic representation of an electric converter according to another embodiment of the invention.

Thus, FIG. 7 represents another embodiment wherein the converter comprises a resistor R 11 and three switches Q1, Q2, Q3. The two switches Q2 and Q3 are connected in parallel with each other. The switch Q1 is connected in series with the two switches Q2 and Q3. A circuit RC is connected in parallel with the switches Q2 and Q3. A circuit RC is connected in parallel with the switch Q1.

In normal operation, the switch Q1 is always closed to limit its constraints, in terms of voltage and temperature, and to increase its lifetime. The switches Q2 and Q3 switch alternately as described with reference to FIGS. 3 and 4.

In the event of a fault of a switch Q2 or Q3 being detected, the other switch in parallel with the faulty switch is placed in closed position and only the switch Q1 is controlled.

The invention claimed is:

1. A system for dissipating regenerated electric energy produced by an electric actuator of an aircraft, the dissipating system comprising:
   a resistor;
   two switching arms, each switching arm being connected in series with the resistor, the two switching arms being connected together in parallel, each switching arm comprising two switches connected to one another in series, each switch comprising two terminals and a control grid, an opening and closing of each switch being controlled by applying a voltage control signal on the control grid thereof, wherein the two switches which belong to a same switching arm are configured to be open simultaneously and closed simultaneously, the two switching arms being configured to be closed alternately;
a measurement system configured to measure a voltage at the terminals of each switch.

2. The dissipating system according to claim 1, further comprising a balancing circuit mounted in parallel with each switch, each balancing circuit comprising a balancing resistor, and a balancing capacitance.

3. The dissipating system according to claim 1, further comprising a compensation circuit mounted in parallel with each switch, each compensation circuit comprising a compensation resistor.

4. The dissipating system according to claim 1, wherein each switch is an insulated gate bipolar transistor.

5. An electric converter for supplying at least one electric actuator of an aircraft from an alternating electrical power supply, the converter comprising:
a rectifier;
a dissipating system according to claim 1, the dissipating system being mounted in parallel with the rectifier;
a capacitance mounted in parallel with the dissipating system.

6. A method for dissipating energy in a system
for dissipating regenerated electric energy produced by an electric actuator of an aircraft, the dissipating system comprising a resistor; two switching arms, each switching arm being connected in series with the resistor, the two switching arms being connected together in parallel, each switching arm comprising two switches connected to one another in series, each switch comprising two terminals and a control grid, an opening and closing of each switch being controlled by applying a voltage control signal on the control grid thereof, and a measurement system configured to measure a voltage at the terminals of each switch, the method comprising controlling the two switches of a same arm so as to be open simultaneously and closed simultaneously, the switches further being controlled so as to close the two arms alternately.

7. The method according to claim 6, wherein, each switch is controlled by a pulse width modulation signal, the pulse width modulation signals controlling the two arms being dephased with respect to each other so that one arm is closed while the other arm is open.

8. The method according to claim 7, wherein, each time that a switch is closed, the method comprises the following steps:
measuring the voltage at the terminals of said switch;
comparing the measured voltage with a threshold voltage.

9. The method according to claim 8, wherein, when the voltage measured at the terminals of a switch is above the threshold voltage, the method comprises:
maintaining the switch belonging to the same arm as a faulty switch in an open position;
controlling the switches belonging to the other arm by a pulse width modulation signal having a frequency two times greater than a frequency of the normal signal.

* * * * *